US011325725B2

(12) United States Patent
Saito et al.

(10) Patent No.: US 11,325,725 B2
(45) Date of Patent: May 10, 2022

(54) AIRCRAFT MANAGEMENT DEVICE, METHOD, AND PROGRAM

(71) Applicant: MITSUBISHI HEAVY INDUSTRIES, LTD., Tokyo (JP)

(72) Inventors: Nozomi Saito, Tokyo (JP); Takashi Yari, Tokyo (JP); Nobuhiro Higuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 365 days.

(21) Appl. No.: 16/488,093

(22) PCT Filed: Feb. 22, 2018

(86) PCT No.: PCT/JP2018/006370
§ 371 (c)(1),
(2) Date: Aug. 22, 2019

(87) PCT Pub. No.: WO2018/155529
PCT Pub. Date: Aug. 30, 2018

(65) Prior Publication Data
US 2021/0130012 A1 May 6, 2021

(30) Foreign Application Priority Data

Feb. 27, 2017 (JP) .............................. JP2017-035024

(51) Int. Cl.
*B64F 5/60* (2017.01)
*B64F 5/40* (2017.01)
(52) U.S. Cl.
CPC . *B64F 5/60* (2017.01); *B64F 5/40* (2017.01)
(58) Field of Classification Search
CPC ..................................... B64F 5/60; B64F 5/40
See application file for complete search history.

(56) References Cited

U.S. PATENT DOCUMENTS 5,828,969 A    10/1998   Chamney et al.
8,774,988 B2 *   7/2014   Plowman ........... G05B 23/0275
                                                                                  701/14

(Continued)

FOREIGN PATENT DOCUMENTS

JP         7-329893       12/1995
JP      2010-523387       7/2010

(Continued)

OTHER PUBLICATIONS

International Search Report dated May 15, 2018 in corresponding International Application No. PCT/JP2018/006370.

*Primary Examiner* — Jason L Vaughan
(74) *Attorney, Agent, or Firm* — Wenderoth, Lind & Ponack, L.L.P.

(57) ABSTRACT

The present invention comprises: a fatigue estimation unit that estimates the fatigue life of a prescribed area of a fuselage, on the basis of the level of damage in the prescribed area during operation; a determination unit that determines whether the estimated fatigue life will be reached after a prescribed period of time has elapsed; a repair determination unit that determines that repair of the fuselage is unnecessary if a determination is made that the estimated fatigue life will be reached after the prescribed period of time has elapsed, and that determines that the fuselage is to be repaired if a determination is made that the estimated fatigue life will be reached within the prescribed period of time; and a selection unit that, if a determination is made that the fuselage is to be repaired, selects a repair method corresponding to the detected degree of damage in the prescribed area.

7 Claims, 4 Drawing Sheets

(56) References Cited

U.S. PATENT DOCUMENTS

| | | | |
|---|---|---|---|
| 8,972,101 B2* | 3/2015 | Catt | B64C 9/00 |
| | | | 701/31.9 |
| 9,008,892 B2* | 4/2015 | Bollapragada | G07C 5/006 |
| | | | 701/29.1 |
| 10,025,893 B2* | 7/2018 | Andersson | G05B 23/0254 |
| 10,239,640 B2* | 3/2019 | Ethington | G07C 5/0841 |
| 10,650,614 B2* | 5/2020 | Huber | G07C 5/0808 |
| 10,753,536 B2* | 8/2020 | Berkebile | G07C 5/0808 |
| 10,809,051 B2* | 10/2020 | Saito | G01M 11/086 |
| 2010/0131149 A1 | 5/2010 | Saugnac et al. | |
| 2010/0161244 A1* | 6/2010 | Ghoshal | G01N 29/14 |
| | | | 702/35 |
| 2013/0166458 A1 | 6/2013 | Wallner et al. | |
| 2013/0179028 A1 | 7/2013 | Gu et al. | |
| 2013/0311111 A1 | 11/2013 | Lewis et al. | |
| 2016/0259873 A1 | 9/2016 | Kessie et al. | |
| 2016/0313728 A1 | 10/2016 | Anfriani et al. | |
| 2018/0349532 A1 | 12/2018 | Kessie et al. | |
| 2019/0382127 A1* | 12/2019 | Yari | B64F 5/40 |
| 2020/0239162 A1* | 7/2020 | Saito | B64F 5/60 |

FOREIGN PATENT DOCUMENTS

| | | |
|---|---|---|
| JP | 2013-18482 | 1/2013 |
| JP | 2013-239175 | 11/2013 |
| JP | 2016-173358 | 9/2016 |
| JP | 2017-502193 | 1/2017 |

\* cited by examiner

AIRCRAFT MANAGEMENT DEVICE, METHOD, AND PROGRAM

TECHNICAL FIELD

The present invention relates to an aircraft management device, method, and program.

BACKGROUND ART

In recent years, in order to reduce the operating cost of aircrafts, the maintenance cost of aircraft structures, and the like, there is a growing demand for diagnosing structural integrity in airlines and the like. As a method therefor, application of a structural health monitoring (hereinafter, also referred to as "SHM") system is expected. The SHM system can contribute to the reduction of the maintenance cost by reducing the inspection period of the aircraft structure. There is an active movement to apply an operation management method using monitoring data of the SHM system.

Using the data of the SHM system for inspection or maintenance is partially recognized in the regulation. However, it is still the mainstream to periodically perform visual inspection or non-destructive inspection that has been performed conventionally.

PTL 1 below describes operation management for providing a period until repair or a new inspection interval of a repair location using various kinds of data, such as operation data, periodic inspection reports, repair records, and monitoring data.

CITATION LIST

Patent Literature

[PTL 1] US2013/0166458A

SUMMARY OF INVENTION

Technical Problem

In recent years, the concept of condition-based maintenance (hereinafter, also referred to as "CBM") has been proposed in which monitoring data is used to perform detailed inspections or repairs only in a case where damage or the like occurs. The CBM is a preventive maintenance concept that maintenance is performed only in a case where it is determined that the maintenance is required. Compared with time-based maintenance in which maintenance is performed at fixed time intervals in order to prevent failures in advance, the CBM can reduce the fuselage downtime. However, in the CBM concept, since the data of the SHM system is used, data obtained by other tests and the like cannot be used.

In addition, in PTL 1 described above, a period until repair or a new inspection interval is provided for a location once repaired, but the inspection interval is not adjusted for locations where repairs have not been performed. For this reason, there is a problem that the fuselage downtime cannot be reduced and accordingly fuselage repairs cannot be performed quickly.

The present invention has been made in view of such circumstances, and it is an object of the present invention to provide an aircraft management device, method, and program capable of reducing fuselage downtime and performing fuselage repairs quickly.

Solution to Problem

In order to solve the aforementioned problem, the present invention adopts the following means.

The present invention provides an aircraft management device including: a fatigue estimation unit that estimates a fatigue life of a predetermined area of a fuselage of an aircraft under operation based on a damage level of the predetermined area of the fuselage; a determination unit that determines whether or not the estimated fatigue life will be reached after a predetermined period of time has elapsed from present; a repair determination unit that determines that repair of the fuselage is unnecessary at a current point in time in a case where it is determined that the estimated fatigue life will be reached after the predetermined period of time has elapsed from the present and that determines that the fuselage is to be repaired in a case where it is determined that the estimated fatigue life will be reached within the predetermined period of time from the present; and a selection unit that selects a repair method corresponding to a detected degree of damage in the predetermined area in a case where it is determined that the fuselage is to be repaired.

According to the present invention, the fatigue life of the fuselage is estimated based on the damage level of the predetermined area of the fuselage under operation. In a case where it is determined that the estimated fatigue life will be reached after a predetermined period of time has elapsed from the present, it is determined that repair of the fuselage is not necessary at the current point in time. In a case where it is determined that the estimated fatigue life will be reached within a predetermined period of time from the present, it is determined that the fuselage is to be repaired. In a case where it is determined that the fuselage is to be repaired, a repair method corresponding to the detected degree of damage is selected.

As described above, in a case where it is determined that the fatigue life will be reached after a predetermined period of time has elapsed, it can be determined that scheduled fatigue has occurred due to the assumed operation. In a case where it is determined that the fatigue life will be reached within a predetermined period of time, it can be determined that the degree of fatigue is greater than the expected scheduled operation. In addition, in a case where it is determined that the fuselage is to be repaired, since a repair method corresponding to the detected degree of damage is selected, it is possible to perform repair according to the damage. Therefore, an appropriate repair method is provided for the fuselage under operation.

The selection unit of the aircraft management device described above may select a repair method for the fuselage, for which the fatigue life has been estimated, based on a damage history for the predetermined area and a repair history for the damage history in the past in a case where it is determined that the fuselage is to be repaired.

Thus, in a case where it is determined that the fuselage is to be repaired, a repair method of the fuselage for which the fatigue life has been estimated is selected based on the past damage history and repair history. Therefore, repairs can be performed according to the response at the time of damage to the aircraft in the past. In addition, a more appropriate repair method is provided for the fuselage under operation.

The aircraft management device described above may include a calculation unit that calculates a damage level of the predetermined area of the fuselage under operation based on an operation status of the aircraft and physical parameters for the predetermined area of the aircraft obtained by operation of the aircraft.

The operation status of the aircraft and the physical parameters for the predetermined area of the aircraft obtained by the operation of the aircraft are parameters that make it possible to grasp the influence on the fuselage by the operation of the aircraft. Therefore, the damage level of the predetermined area can be correctly calculated by using these physical parameters.

A necessities presentation unit that presents at least one of items required for the repair according to the repair method selected by the selection unit of the aircraft management device described above or a person in charge of the repair may be provided.

Since at least one of items required for the repair (for example, components of the fuselage to be repaired, equipment, and the like) or a person in charge of the repair (for example, the name of a worker involved in the work, attribute information of the worker, and the like) is presented, it is possible to arrange the items or the person required for the repair before the fuselage under operation arrives. As a result, since the fuselage can be quickly repaired after the fuselage arrives, it is possible to reduce the fuselage downtime.

In the aircraft management device described above, a schedule setting unit that sets a periodic inspection schedule for periodically performing maintenance of the aircraft based on the damage level may be provided.

The present invention provides an aircraft management method including: a fatigue estimation step of estimating a fatigue life of a predetermined area of a fuselage of an aircraft under operation based on a damage level of the predetermined area; a determination step of determining whether or not the estimated fatigue life will be reached after a predetermined period of time has elapsed from present; a repair determination step of determining that repair of the fuselage is unnecessary at a current point in time in a case where it is determined that the estimated fatigue life will be reached after the predetermined period of time has elapsed from the present and determining that the fuselage is to be repaired in a case where it is determined that the estimated fatigue life will be reached within the predetermined period of time from the present; and a selection step of selecting a repair method corresponding to a detected degree of damage in the predetermined area in a case where it is determined that the fuselage is to be repaired.

The present invention provides an aircraft management program causing a computer to execute: fatigue estimation processing for estimating a fatigue life of a predetermined area of a fuselage of an aircraft under operation based on a damage level of the predetermined area; determination processing for determining whether or not the estimated fatigue life will be reached after a predetermined period of time has elapsed from present; repair determination processing for determining that repair of the fuselage is unnecessary at a current point in time in a case where it is determined that the estimated fatigue life will be reached after the predetermined period of time has elapsed from the present and determining that the fuselage is to be repaired in a case where it is determined that the estimated fatigue life will be reached within the predetermined period of time from the present; and selection processing for selecting a repair method corresponding to a detected degree of damage in the predetermined area in a case where it is determined that the fuselage is to be repaired.

Advantageous Effects of Invention

The present invention is effective in reducing the fuselage downtime so that the fuselage can be quickly repaired.

DESCRIPTION OF EMBODIMENTS

Hereinafter, embodiments of an aircraft management device, method, and program according to the present invention will be described with reference to the diagrams.

Figure 1:
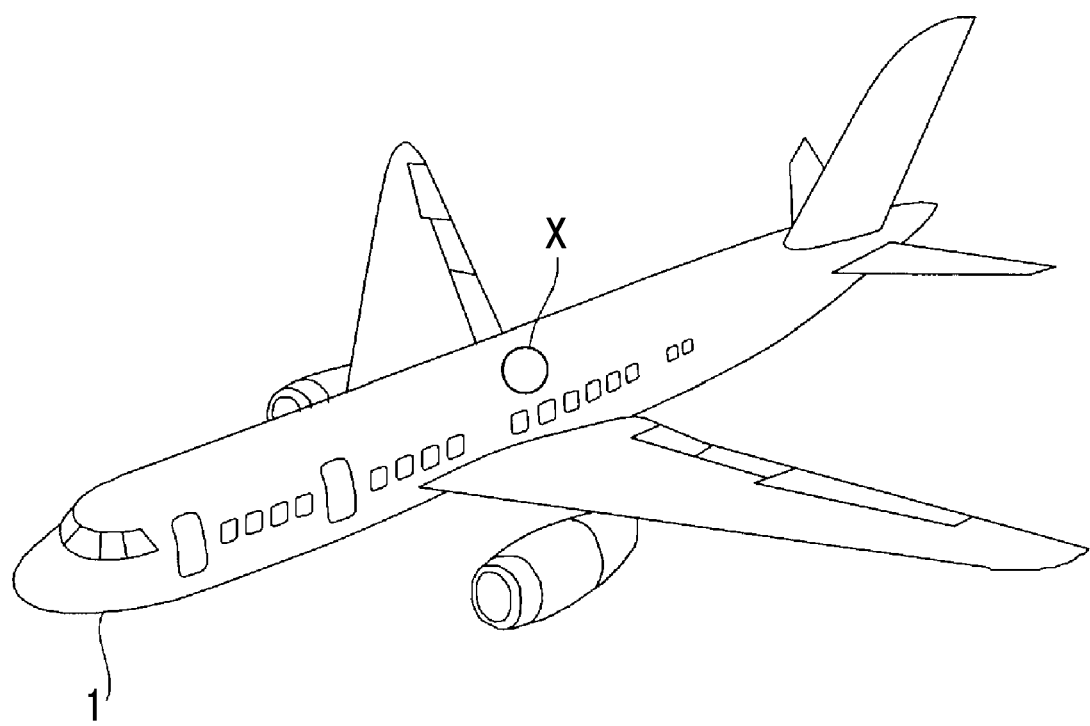
FIG. 1 shows an example of an aircraft to which an aircraft management device according to the present invention is applied.

Hereinafter, as shown in FIG. 1, an aircraft 1 to be inspected and the acquisition of physical parameters from a predetermined area X provided in the aircraft 1 will be described. Although the predetermined area X is shown at only one location in FIG. 1, only one location is shown for convenience of explanation, and it is preferable that there are a plurality of predetermined areas X for acquiring physical parameters.

Figure 2:
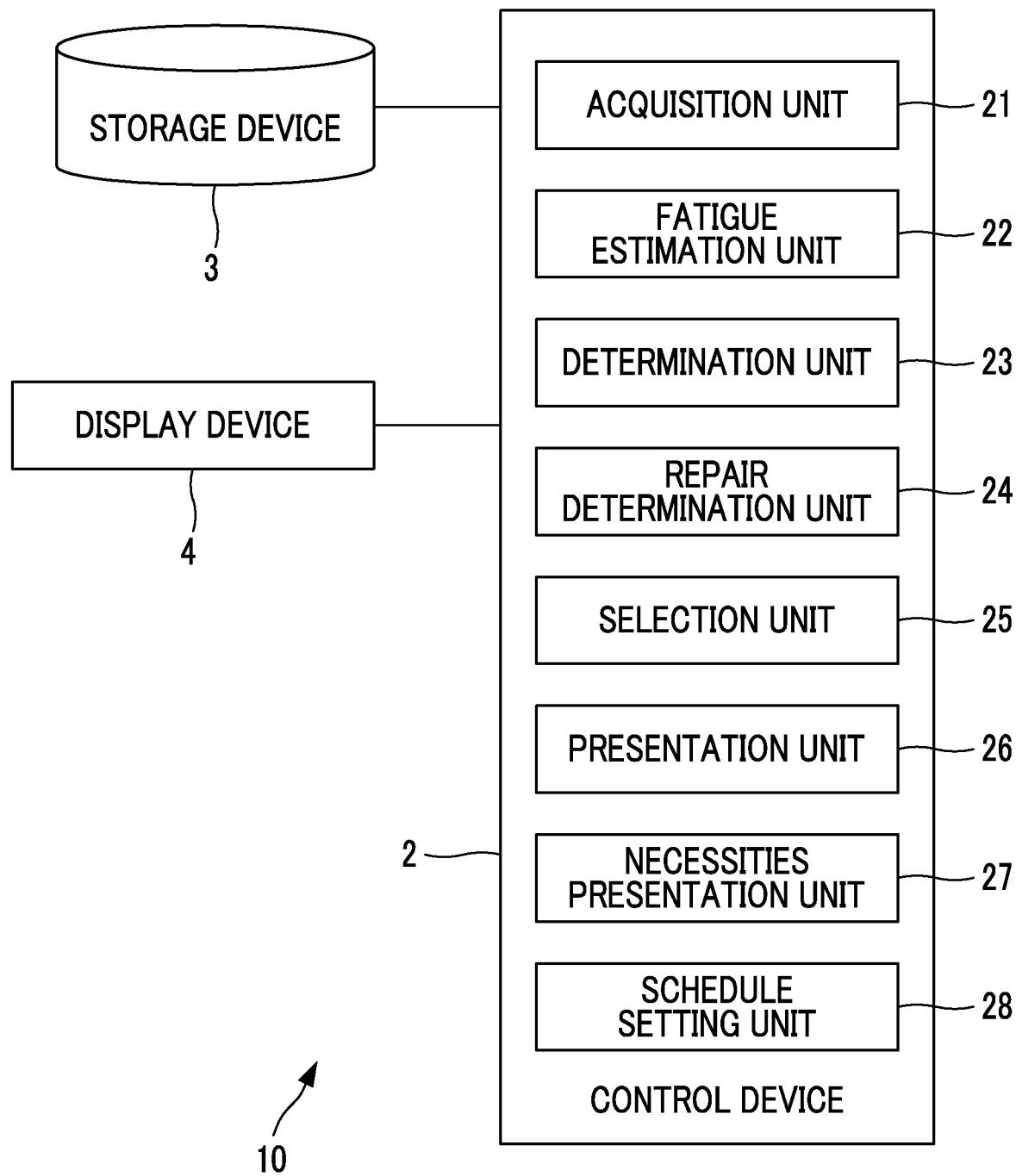
FIG. 2 is a functional block diagram of the aircraft management device according to the present invention.

FIG. 2 shows a functional block diagram of an aircraft management device 10 that presents a method of repairing the aircraft 1.

The aircraft management device 10 includes a control device 2, a storage device 3, and a display device 4.

The storage device 3 stores data of the operation status of the aircraft 1 (hereinafter, referred to as "operation data"), physical parameters for the predetermined area X of the aircraft 1 obtained by the operation of the aircraft 1, and the like as a database so as to be associated with each other. Information of the operation data and the physical parameters for the predetermined area X may be input from the outside via an input device (not shown) or the like, or may be appropriately input from the control device 2.

The operation data is, for example, information recorded in a flight recorder (flight recording device), and includes history information, such as altitude, temperature, and wind speed during the operation of the aircraft 1.

The physical parameters for the predetermined area X of the aircraft 1 obtained by the operation of the aircraft include, for example, structural damage record data obtained by inspection (for example, periodic inspection) on the aircraft 1 and structural condition data obtained by structural health monitoring (hereinafter, also referred to as "SHM").

The structural damage record obtained by the inspection includes, for example, information such as a damage location (type, size, and structure), the degree of damage, and repair history.

In the SHM, an acceleration sensor, a strain gauge, and the like are installed in the aircraft 1 (structure), and the structural performance is diagnosed from response waveforms obtained from the acceleration sensor, the strain gauge, and the like during the operation of the aircraft 1. The structural condition data obtained by the SHM include, for example, information such as damage occurrence, strain condition, and the degree of corrosion.

Based on a read command, information stored as a database is read out from the storage device 3. In addition, the storage device 3 may store various kinds of information acquired from an acquisition unit 21, which will be described later, as a database.

Thus, in the storage device 3, the operation data, the structural damage record, and the structural condition data are associated with each other to form a database. In a case where data acquired by the acquisition unit 21 (will be described in detail later) matches (or approximates) the operation data or the structural condition data in the database, a structural damage record associated with the operation data or the structural condition data is read out. Therefore, it is possible to read out an appropriate repair method with reference to the repair history corresponding to the degree of damage in the past.

In addition, it is assumed that the association between the operation data, the structural damage record, and the structural condition data is set based on the past information (experience) by a worker, artificial intelligence, or the like.

The display device 4 displays various kinds of information to present the information to the worker.

The control device 2 is, for example, a computer, and includes a CPU, a read only memory (ROM) for storing programs executed by the CPU and the like, a random access memory (RAM) that functions as a work area at the time of executing each program, and the like. A series of process steps for realizing various functions to be described later are recorded in a recording medium or the like in the form of a program (for example, a repair method presentation program). The CPU reads out this program to the RAM or the like and executes information processing and calculation processing to realize various functions to be described later.

The control device 2 in the present embodiment mainly performs prediction of fatigue life, prediction of progress of fatigue damage, prediction of repair timing and repair method, prediction of maintenance timing, optimization of periodic inspection schedule, components arrangement, and the like.

Specifically, the control device 2 includes the acquisition unit 21, a fatigue estimation unit 22, a determination unit 23, a repair determination unit 24, a selection unit 25, a presentation unit 26, a necessities presentation unit 27, and a schedule setting unit 28. In addition, the control device 2 is connected to the storage device 3 so that information can be transmitted and received.

The acquisition unit 21 acquires operation data of the aircraft 1 and physical parameters for the predetermined area X of the aircraft 1 obtained by the operation of the aircraft 1. In addition, in a case where the acquisition unit 21 acquires information of the operation data of the aircraft 1 and the physical parameters for the predetermined area X, the information is output to the fatigue estimation unit 22 and stored in the storage device 3.

The fatigue estimation unit 22 estimates a fatigue life in the predetermined area X of the fuselage under operation. Specifically, the fatigue estimation unit 22 inputs the information of the operation data of the aircraft 1 and the physical parameters for the predetermined area X acquired by the acquisition unit 21 and boundary conditions to the theoretical equation, such as a structural analysis model and a load estimation equation. Based on the output (for example, the estimated load) obtained by this, the fatigue estimation unit 22 estimates the stress of the predetermined area X. In addition, the fatigue estimation unit 22 estimates the fatigue life of the predetermined area X based on the estimation result of the stress of the predetermined area X. For example, the fatigue estimation unit 22 estimates a life to fatigue failure (hereinafter, referred to as a "fatigue life") by the cumulative damage rule. Specifically, based on the minor rule shown in the following Equation (1), a fatigue life Nf is estimated in consideration of a fatigue life safety factor SF (refer to the following Equation (2)). D is the degree of damage.

$$D = \sum_{i=1}^{N} \frac{ni}{Ni} \quad (1)$$

$$Nf = \left(\frac{1}{SF \times D} - 1\right) \times N \quad (2)$$

The fatigue estimation unit 22 predicts the fatigue life Nf of the predetermined area X of the aircraft 1 based on the estimated load.

Figure 3:
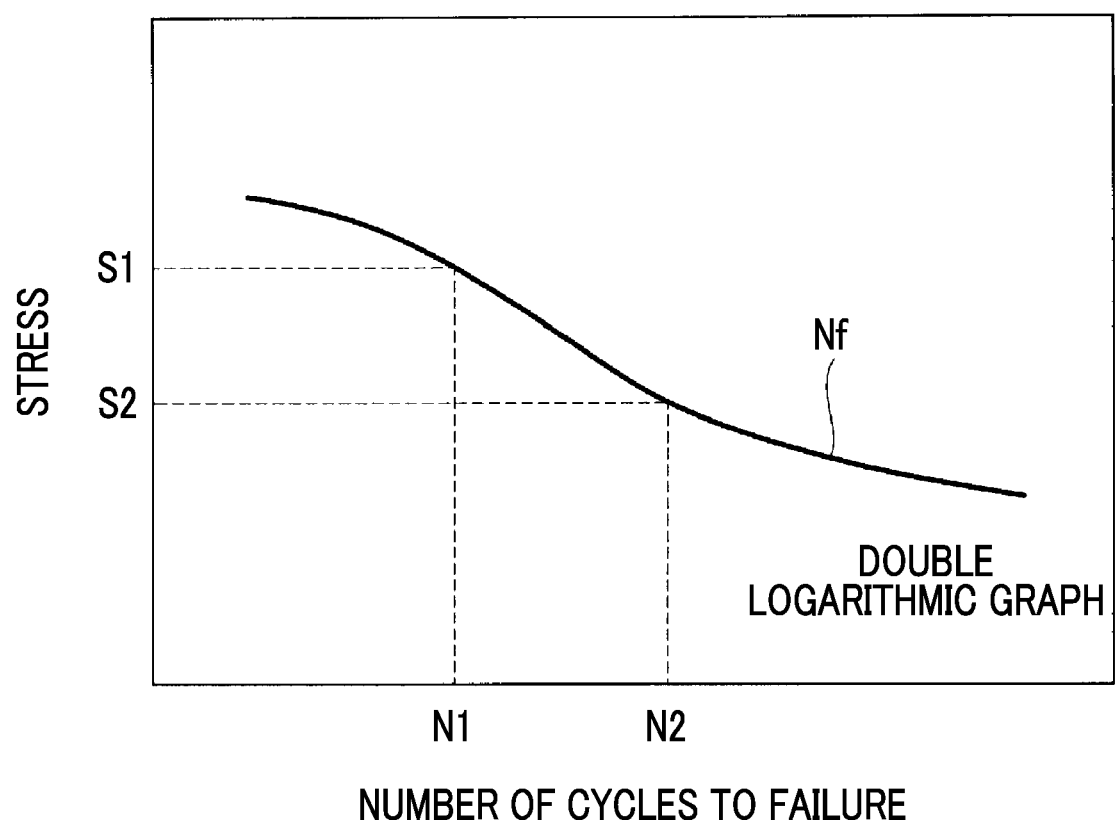
FIG. 3 is a diagram for explaining a fatigue life curve.

FIG. 3 shows a fatigue life curve (SN curve) in a graph.

As shown in FIG. 3, the vertical axis indicates a logarithmic scale of the amplitude of the stress that is a stress (S) applied repeatedly, and the horizontal axis indicates a logarithmic scale of the number of cycles to failure (N) in a case where a fixed stress amplitude is given. The fatigue life Nf in a case where the fixed stress amplitude of the predetermined area X is given is shown by the solid line. The fatigue estimation unit 22 calculates the degree of damage D from the estimated stress amplitude and the number of cycles according to Equation (1). In a case where the fatigue life safety factor SF is not taken into consideration, it is predicted that the predetermined area X leads to fatigue failure at a time at which the degree of damage D becomes 1. The fatigue estimation unit 22 predicts the fatigue life Nf from the degree of damage D and the fatigue life safety factor SF according to Equation (2).

For example, assuming that the degree of damage D is 0.25 and the safety factor SF is 2, the above Equation (2) becomes Nf=N. Accordingly, the remaining fatigue life Nf is the same as N that is the use history (for example, the number of hours, the number of flights, and the like) up to the present. That is, the fatigue life Nf indicates that half of the life has been reached.

Based on the estimated stress amplitude and the number of cycles, the fatigue estimation unit 22 appropriately changes the SN curve so as to express the remaining fatigue life Nf of the predetermined area X in consideration of the damage that the predetermined area X has received so far.

The determination unit 23 determines whether or not the fatigue life Nf will be reached after a predetermined period of time has elapsed from the present (present <<estimated life) based on the prediction result of the fatigue life Nf, and outputs the determination result to the repair determination unit 24.

The repair determination unit 24 determines the necessity of repair based on the determination result of the determination unit 23. For example, in a case where the determination unit 23 determines that the remaining fatigue life Nf is after a predetermined period of time has elapsed from the present (present <<estimated life), the repair determination unit 24 outputs a determination result (for example, damage level 1) that the fuselage "is not repaired" at the current point in time to the presentation unit 26 and the schedule setting unit 28. In a case where the determination unit 23 determines that the remaining fatigue life Nf will be reached within a predetermined period of time from the present (present ≅estimated life) or in a case where the estimated life has already been reached (present >estimated life), the repair determination unit 24 outputs a determination result (for example, damage level 2), which indicates that the predetermined area X of the aircraft 1 is to be repaired or components relevant to the predetermined area X are to be replaced, to the presentation unit 26 and the schedule setting unit 28.

The case where the fatigue life Nf is after a predetermined period of time has elapsed from the present indicates that the aircraft 1 has been used as expected and the life is as scheduled. The case where the fatigue life Nf has already been reached or the case where the fatigue life Nf will be reached within a predetermined period of time indicates that an unexpected situation, such as an accident or a trouble, has occurred in the aircraft 1 and fatigue or the like is progressing more than expected.

In a case where it is determined that the fuselage is to be repaired, the selection unit 25 selects a repair method corresponding to the detected degree of damage. For example, the selection unit 25 selects a repair method corresponding to the type of damage detected in the predetermined area X to be determined, the size of the damage, the structure of the damaged portion, the fatigue life Nf, and the like from the database of the storage device 3. A predetermined rule is set for the selection of a repair method by the selection unit 25, and the selection is made based on the predetermined rule. In the predetermined rule, for example, stepwise threshold values are set for various parameters, such as the type of damage, the size of damage, the structure of a damaged portion, and the fatigue life Nf, and a repair method is set according to the exceeded threshold value.

In a case where it is determined that the fuselage is to be repaired, the selection unit 25 selects a repair method for the fuselage, for which the fatigue life Nf has been estimated, based on the damage history for the predetermined area X and the repair history for the damage history in the past.

The presentation unit 26 presents a method of repairing the aircraft 1 on the display device 4 based on the damage level.

For example, in a case where the information of "damage level 1" is acquired, the presentation unit 26 presents "no repair". In a case where the information of "damage level 2" is acquired, the presentation unit 26 estimates the damage condition from the structural analysis model and reads out a repair method, which corresponds to the degree of damage corresponding to the damage of the acquired "damage level 2", from the database stored in the storage device 3, and presents the read repair method to the display device 4.

In a case where it is determined that the estimated life has already been reached or the life will be reached within a predetermined period of time, it is preferable to set the repair timing to the earliest execution timing from the present since it is considered that prompt repair is necessary.

In addition, the presentation unit 26 outputs the information of the repair method to be presented to the necessities presentation unit 27.

The necessities presentation unit 27 presents at least one of items, such as components and equipment required to perform the repair according to the repair method presented by the presentation unit 26, or information of a person in charge of the work, such as the name of a worker involved in the work and the attribute information of the worker. As long as the worker in charge can grasp that the current timing exceeds the fatigue life Nf by checking the content presented to the necessities presentation unit 27, it is possible to repair the aircraft 1 quickly after arrival. Therefore, it is possible to reduce the fuselage downtime. In addition, before arrival of the aircraft 1, it is possible to arrange necessities required in the presented repair method.

The schedule setting unit 28 sets a periodic inspection schedule for periodically performing maintenance of the aircraft 1 based on the damage level. Specifically, the schedule setting unit 28 does not change the periodic inspection schedule in a case where the information of "damage level 1" is acquired from the determination unit 23. Therefore, a maintenance timing based on the already set periodic inspection schedule is set.

In a case where the information of "damage level 2" is acquired from the determination unit 23, the schedule setting unit 28 changes the periodic inspection schedule according to the update of the SN curve to optimize the schedule.

The periodic inspection schedule is defined in the regulation of the aircraft 1, and it is necessary to observe the interval at the time of acquiring type certification. However, the standard may be changed in the future by condition-based maintenance (CBM). According to the present embodiment, the periodic inspection schedule can be changed based on the information of the damage level of the fuselage. Therefore, by using various kinds of data, such as an operation status or physical parameters, in an integrated manner, it is possible to set a highly accurate inspection and maintenance schedule.

Hereinafter, the operation of the aircraft management device 10 according to the present embodiment will be described with reference to FIGS. 1 to 4.

Figure 4:
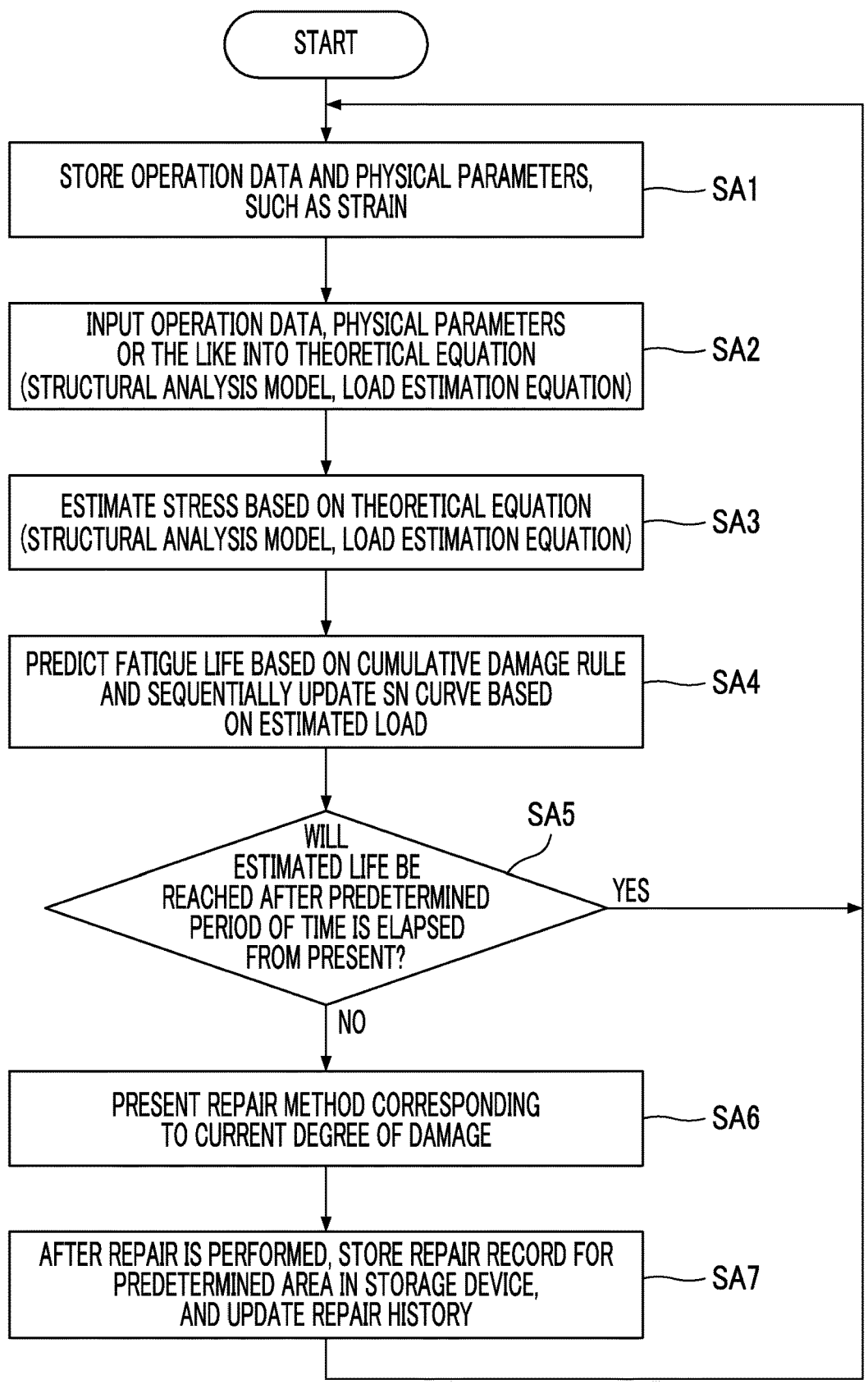
FIG. 4 is an operation flow of the aircraft management device according to the present invention.

The storage device 3 stores past operation data or information obtained by physical parameter monitoring (step SA1 in FIG. 4).

In a case where operation data obtained by the operation of the aircraft 1 or monitoring data of physical parameters, such as strain, is acquired, the monitoring data is input to the theoretical equation, such as a structural analysis model and a load estimation equation (step SA2 in FIG. 4), and the load or the like of the predetermined area X of the aircraft 1 is estimated and the stress is estimated based on the theoretical equation (step SA3 in FIG. 4).

The fatigue life Nf is predicted based on the cumulative damage rule and the estimated stress. In addition, the SN curve (fatigue life curve) is updated based on the estimated load (step SA4 in FIG. 4).

It is determined whether or not the fatigue life Nf will be reached after a predetermined period of time has elapsed from the present (step SA5 in FIG. 4). In a case where it is determined that the fatigue life Nf will be reached after a predetermined period of time has elapsed from the present, there is no repair at the current point in time and the periodic inspection schedule is not changed, and the process returns to step SA1.

In a case where it is determined that the fatigue life Nf is now or has already been reached (No of step SA5 in FIG. 4), a repair method corresponding to the current degree of damage is presented (step SA6 in FIG. 4).

In a case where the repair has been performed, the repair record for the predetermined area X is stored in the storage device 3, so that the repair history is updated (step SA7 in FIG. 4). At this time, it is preferable to modify the analysis model and correct the fatigue life curve (SN curve).

As described above, according to the aircraft management device 10, the repair method presentation method, and the repair method presentation program according to the present embodiment, the fatigue life Nf of the fuselage is estimated based on the damage level in the predetermined area X of the fuselage under operation. In a case where it is determined that the estimated fatigue life Nf will be reached after a predetermined period of time has elapsed from the present, it is determined that repair of the fuselage is not necessary at the current point in time. In a case where it is determined that the estimated fatigue life Nf will be reached within a predetermined period of time from the present, it is determined that the fuselage is to be repaired. In a case where it is determined that the fuselage is to be repaired, a repair method for the fuselage for which the fatigue life Nf has been estimated is selected based on the damage history and the repair history for the damage history in the past.

As described above, in a case where it is determined that the fatigue life Nf will be reached after a predetermined period of time has elapsed, it can be determined that scheduled fatigue has occurred due to the assumed operation. In a case where it is determined that the fatigue life Nf will be reached within a predetermined period of time, it can be determined that the degree of fatigue is greater than the expected scheduled operation. In addition, in a case where it is determined that the fuselage is to be repaired, a repair method of the fuselage for which the fatigue life Nf has been estimated is selected based on the past damage history and repair history. Therefore, since repairs can be performed according to the response at the time of damage to the aircraft 1 in the past, an appropriate repair method is provided for the fuselage under operation.

The operation data of the aircraft 1 and physical parameters for the predetermined area X of the aircraft 1 obtained by operation of the aircraft 1 are parameters that make it possible to grasp the influence on the fuselage by the operation of the aircraft 1. Therefore, the damage level of the predetermined area X can be correctly calculated by using these physical parameters.

Since at least one of items required for the repair (for example, components of the fuselage to be repaired, equipment, and the like) or a person in charge of the repair (for example, the name of a worker involved in the work, attribute information of the worker, and the like) is presented, it is possible to arrange the items or the person required for the repair before the fuselage under operation arrives. As a result, since the fuselage can be quickly repaired after the fuselage arrives, it is possible to reduce the fuselage downtime.

While the embodiment of the present invention has been described in detail with reference to the diagrams, the specific configuration is not limited to this embodiment, and design changes and the like without departing from the subject matter of the present invention are also included.

REFERENCE SIGNS LIST

1: aircraft
2: control device
3: storage device
10: aircraft management device
21: acquisition unit
22: fatigue estimation unit
23: determination unit
24: repair determination unit
25: selection unit
26: presentation unit
27: necessities presentation unit
28: schedule setting unit
X: predetermined area

The invention claimed is:

1. An aircraft management device, comprising:
a fatigue estimation unit that estimates a fatigue life of a predetermined area of a fuselage of an aircraft under operation based on a damage level of the predetermined area of the fuselage, the damage level being calculated based on an estimation result of a stress of the predetermined area;
a determination unit that determines whether or not the estimated fatigue life will be reached after a predetermined period of time has elapsed from present;
a repair determination unit that determines that repair of the fuselage is unnecessary at a current point in time in a case where it is determined that the estimated fatigue life will be reached after the predetermined period of time has elapsed from the present and that determines that the fuselage is to be repaired in a case where it is determined that the estimated fatigue life will be reached within the predetermined period of time from the present; and
a selection unit that selects a repair method corresponding to a detected degree of damage in the predetermined area in a case where it is determined that the fuselage is to be repaired.

2. The aircraft management device according to claim 1, wherein, in a case where it is determined that the fuselage is to be repaired, the selection unit selects a repair method for the fuselage, for which the fatigue life has been estimated, based on a damage history for the predetermined area and a repair history for the damage history in the past.

3. The aircraft management device according to claim 1, wherein the damage level of the predetermined area of the fuselage under operation is calculated based on an operation status of the aircraft and physical parameters for the predetermined area of the aircraft obtained by operation of the aircraft.

4. The aircraft management device according to claim 1, further comprising:
a necessities presentation unit that presents at least one of items required for the repair according to the repair method selected by the selection unit or a person in charge of the repair.

5. The aircraft management device according to claim 1, further comprising:
a schedule setting unit that sets a periodic inspection schedule for periodically performing maintenance of the aircraft based on the damage level.

6. An aircraft management method, comprising:
a fatigue estimation step of estimating a fatigue life of a predetermined area of a fuselage of an aircraft under operation based on a damage level of the predetermined area, the damage level being calculated based on an estimation result of a stress of the predetermined area;
a determination step of determining whether or not the estimated fatigue life will be reached after a predetermined period of time has elapsed from present;
a repair determination step of determining that repair of the fuselage is unnecessary at a current point in time in a case where it is determined that the estimated fatigue life will be reached after the predetermined period of time has elapsed from the present and determining that the fuselage is to be repaired in a case where it is determined that the estimated fatigue life will be reached within the predetermined period of time from the present; and a selection step of selecting a repair method corresponding to a detected degree of damage in the predetermined area in a case where it is determined that the fuselage is to be repaired.

7. An aircraft management program embodied on a non-transitory computer-readable medium, and causing a computer to execute:

fatigue estimation processing for estimating a fatigue life of a predetermined area of a fuselage of an aircraft under operation based on a damage level of the predetermined area, the damage level being calculated based on an estimation result of a stress of the predetermined area;

determination processing for determining whether or not the estimated fatigue life will be reached after a predetermined period of time has elapsed from present;

repair determination processing for determining that repair of the fuselage is unnecessary at a current point in time in a case where it is determined that the estimated fatigue life will be reached after the predetermined period of time has elapsed from the present and determining that the fuselage is to be repaired in a case where it is determined that the estimated fatigue life will be reached within the predetermined period of time from the present; and selection processing for selecting a repair method corresponding to a detected degree of damage in the predetermined area in a case where it is determined that the fuselage is to be repaired.

* * * * *